United States Patent Office 2,931,771
Patented Apr. 5, 1960

2,931,771

CONTACT FILTRATION OF LUBRICATING OILS AT HIGH TEMPERATURES

Le Roy W. Holm, Crystal Lake, Ill., assignor to The Pure Oil Company, Chicago, Ill., a corporation of Ohio No Drawing. Application December 27, 1955
Serial No. 555,239

4 Claims. (Cl. 208—263)

This invention relates to a clay contacting process for treating lubricating oil base stocks and is directly concerned with improving the neutralization number of unused, non-additive-type lubricating oil stocks.

Refining by adsorption has long been employed as a unit process by refiners of petroleum products. There are available two different types of processes employing adsorption, namely, vapor phase refining and liquid phase treating. Vapor phase treatment generally has application in the refining of relatively light petroleum distillates, especially cracked gasolines, to improve color and odor and reduce the gum content. Heavier petroleum products such as lubricating oil stocks, however, are generally treated in the liquid phase by either passing the oils through a column of granular adsorbents or by mixing the oils in the liquid state with finely divided solid adsorbents at an elevated temperature and then filtering the mixture after treatment to recover an improved lubricating oil stock. The former method is known as percolation and the second method is known as contact filtration. Because, in general, contact filtration methods are more economical than percolation type processes, this method is generally used as one processing stage in the manufacture of lubricating oils and it is with this type of process that the instant invention is specifically concerned. Contact filtration processes also permit greater flexibility in operating conditions, particularly temperature, as well as in changing feed stocks.

In contact filtration the lubricating oil stock is mixed with a finely divided absorbent. This mixture is then heated to an elevated temperature. In plant operations the commingling of the adsorbent and the oil is accomplished by mechanical agitation in a contacting vessel wherein the contacting is carried out at a temperature between about 220 to 650° F. Where the heavier stocks are treated, the higher temperatures of this temperature range are employed. However, various modifications in the general method of procedure may be employed.

Clay is generally used as the adsorbent in refining by contact filtration although other types of solid adsorbents, such as silica gel, bauxite, magnesol and the like, may be employed. These clays, which consist of hydrous aluminosilicates, are either of mineral origin, in which case they are used either as found in nature in their natural state, or after treatment with acid to enhance their adsorptive properties, or they may be prepared synthetically. Many of these clays are sold under trade names such as Filtrol, Attapulgus, etc. Although contact filtration processes have been used in general to clarify and decolorize lubricating oils, they are not successfully employed in all instances to neutralize lubricating oils that have been acid treated, solvent extracted, or simply distilled. The adsorbents will readily remove the stronger acidic substances such as sulfuric acid and other mineral acids from the oils. However, it is well known that even though organic acids can be removed from lubricating oils, the use of contact filtration is not resorted to in these instances because this class of oxygenated compounds cannot be removed economically. A manipulative technique, however, has been discovered which will permit the use of contact filtration processes to substantially reduce the amounts of the weaker organic acids present, either alone or in combination with stronger mineral acids which may be present in mineral lubricating oils.

As an indication of the amounts of acidic constituents present in the oil, a neutralization value is assigned to the oil after subjecting a sample of the oil to the scrutiny of a carefully prescribed procedure. In this test, which is given the A.S.T.M. Designation D974–51T and is fully described in the A.S.T.M. Standards on Petroleum Products—1951, published by the American Society for Testing Material, the acidic constituents are neutralized with a caustic alkali, potassium hydroxide. Neutralization values are generally included in specifications for most mineral lubricating oils for the purposes of indicating the amounts of corrosive acidic substances in the oils and as a refinery control to assure uniformity of composition and characteristics among successive batches of refined mineral oils. Generally, a neutralization value of not greater than 0.1 is specified as a maximum permissible value for lubricating oil stocks.

In U.S. patent application Serial No. 328,798, filed Dec. 30, 1952, and now U.S. Patent No. 2,795,535, there is described and claimed a contact filtration process which, if carried out using a finely divided solid adsorbent, such as clay, bauxite, silica gel, magnesol and the like, that is free from adsorbed water at the temperature at which the contacting is effected, permits a maximum reduction in neutralization value to be effected. It is well known in the prior art that the presence of water in clays as well as other types of solid adsorbents affects the activity of these adsorbents and that too little or too much moisture also has an inimical effect on the efficiency of the clay. Therefore, the prior art has found that in order to treat lubricating oils or other heavy petroleum products such as Vaselines and waxes, to decolorize and clarify them, it is necessary that the solid adsorbents employed as contacting agents be treated to remove a substantial portion of the water adsorbed on the clay. It has been the practice in preparing clays for use to dry them to a controlled moisture content. It is pointed out in the prior art that the tolerable water content of clays may vary between 5 and 20 percent by weight of moisture. It has been found, however, that commercially available clays having water contents within this range are ineffectual in reducing the neutralization numbers of lubricating oils. In order to successfully employ a contact filtration process to neutralize lubricating oils containing organic acid constituents, it is essential in the aforesaid application that the contacting process be carried out with a solid adsorbent which is substantially free from physically bound water. This water is defined as the physically combined or adsorbed moisture which may be removed from the clay by calcining the adsorbent at temperatures below 400 to 500° F., or at the contacting temperature employed in effecting a reduction in the neutralization value.

In the aforesaid application there is demonstrated the effect of adsorbed water on the efficiency of contact agents, such as clay employed in contact filtration, and it is shown that maximum reduction in acid value of the treated oil was attained when the moisture content of the clay adsorbent was reduced to a level such that substantially the only water remaining in the clay during the contacting operation was structural water. This removal of the adsorbed water was brought about by one of several technique, viz:

(1) Stripping of the oil-adsorbent mixture during the contact period with sufficient amounts of an inert, desiccated gaseous medium such as nitrogen, carbon dioxide or methane, (2) Carrying out the contacting of the adsorbent-oil slurry at subatmospheric pressures sufficiently low to effect this end, (3) Combining the techniques in 1 and 2 above, (4) Pretreating the clay adsorbent at an elevated temperature to remove the adsorbed water prior to using the clay as a contacting agent.

As a precautionary measure when resorting to the pretreating technique, wherein the clay is treated at an elevated temperature prior to use to remove the adsorbed moisture, in order to prevent a depreciation in efficiency of the acid-treated types of clay, these substances should be vacuum-dried at about 250° F. to remove all of the adsorbed water from the clay. If these clays are heated at higher temperatures of about 500° F., the efficiency of the clay might be reduced.

In practicing this earlier invention, conventional types of batch or continuous contacting equipment, such as those described in Petroleum Refiner, 28 (9), 267, are employed when modified to permit the use of inert, desiccated gaseous stripping media or subatmospheric pressure in the contacting vessel. The contacting temperature depends upon the nature of the petroleum oil being processed. Generally, lubricating oil fractions commonly called "neutrals" are contacted at temperatures between about 250° and 400° F. The viscous fractions including the so-called bright stocks are heated to 500° F. It is pointed out by Nelson, Petroleum Refinery Engineering, third ed., McGraw-Hill, at page 288, that lower temperatures may be employed in using the operation to effect neutralization. In the contact process the amount of contact agent that is required ranges from 5 to 80 pounds per barrel. It has now been found that substantial reductions in neutralization values can be produced, using lesser amounts of contact agent than would normally be required, by treatment at temperatures appreciably higher than those normally employed in contact processes.

It is therefore the primary object of this invention to effect economics by reducing the amount of contact agent used in the contact filtration treatment of lubricating oils in improving the characteristics of the treated oils. Another object of this invention is the substantial reduction of the neutralization value of viscous petroleum fractions by means of contact filtration. It is also an object of this invention to finish solvent-refined, dewaxed lubricating oils by clay contacting to improve their properties. These and other objects will become apparent from the following detailed description of this invention.

According to this invention, it has been found that the efficiency of contact filtration processes used in the finishing of lubricating oil blending stocks is increased and the amount of contact agent normally employed in contacting operations reduced by carrying out the process of this invention at temperatures higher than those used for contacting operations. By employing temperatures about 100° F. higher than would normally be employed in treating a specific lubricating oil stock, contact filtration produces oils of about zero neutralization number and improved color with appreciably less clay than would be required in carrying out the contact filtration process at conventional temperatures. Other improvements produced by the high temperature contacting include increase in V.I., and decrease in carbon residue content. The subject invention is illustrated by the exemplary, but non-limiting data shown in Table I. These experimental data were obtained by utilizing conventional laboratory equipment. The contacting apparatus consisted of a flask fitted with a thermometer, mechanical stirrer, vent and gas inlet tube. Three hundred to 400 milliliters of a substantially water-free, Mid-Continent-type lubricating oil stock obtained from a Van Zandt crude oil and a prescribed amount of the clay adsorbent were admixed in the flask to form an oil-adsorbent slurry. The mixture was heated according to the following schedule—

| Lubricating Oil Fraction | Contacting Temperature, ° F. |
|---|---|
| Neutrals and distillate fractions within the neutral viscosity range | 490–510 |
| Bright stocks and other fractions within the bright stock viscosity range | 590–620 | and constantly agitated during the course of the treatment which was completed in 10 to 35 minutes. After treating, the mixture was allowed to cool to about 100° F. below the contacting temperature and was then filtered to recover a finished oil. The neutralization value of this oil, as well as the neutralization value of all finished samples, was obtained by means of the aforementioned procedure established by the American Society for Testing Materials. When nitrogen or methane was employed as the inert, desiccated, gaseous stripping medium during the contacting, the flow rates were measured by suitable metering means. In the cases where the moisture content of the oil-adsorbent mixture was measured, the effluent gases from the contact flask were passed through a moisture trap maintained at a low temperature by means of Dry Ice. In this trap the condensed moisture was collected in a graduated receiver. To avoid the deleterious effects of oxidation during the heating of the adsorbent-oil slurry, the preheating was carried out under an inert gaseous atmosphere to insure that air was not in contact with the heated mixture. In the cases where subatmospheric pressures were used, a vacuum was pulled through the vent line with the gas inlet tube closed. When both subatmospheric pressures and gas stripping were employed, the gas inlet tube was opened to a supply of the gas employed.

From the data shown in Table I, the advantages obtained by employing the process of this invention in contact filtration processes are clearly indicated. Substantial reductions in the amounts of clay required to effect maximum reduction in Neutralization Value, as well as improvement in other properties of the treated oil, are evidenced.

It has also been found that the nature of the contacting agent is an important factor in the efficiency of the contacting process. This is demonstrated in Table II which shows the results of high temperature contacts using a variety of contacting agents.

Lubricating oil stocks which can be treated in accordance with this invention include distillates and residua obtained by the vacuum distillation of reduced crude, or by other suitable means, either unfinished or finished by de-asphalting, solvent extraction and/or dewaxing. Specifically, neutrals, bright stocks, residua which have been deasphalted without further refining, raw distillates, and other varieties of lubricating oil stocks can be processed using the subject contact filtration process. Crude oils classified as paraffinic, naphthenic, or mixed base, such as Pennsylvania, California, Mid-Continent, or other similar types, can be used as the lubricating oil source. Although straight mineral oils are substantially neutral, they may have neutralization values as high as 3–4 (ASTM D 974–51T). Substantially complete reductions in neutralization values of these oils can be obtained, to produce oils having substantially zero neutralization values. Different aluminosilicates possess varying effectiveness, with the best results being produced by clays having 75% to 95% silica and 25% to 5% alumina, as typified by X–466 Filtrol marketed by the Filtrol Corporation. However, other less effective clays can be employed if maximum reduction in neutralization value is not required. As has been pointed out above, much less of the contact agent is required than has been normally employed in conventional contact filtration proc-

TABLE I

Clay contacting of lubricating oil distillates and deasphalted oil

| Lubricating oil | Clay* weight percent | Dosage, Lbs./bbl. | Temperature, °F. | Stripping Gas | Stripping Cc./min. | Neutralization value** | Color, NPA | Conradson, weight percent C.R. | SUS at 210° F. | V.I. | Sulfur, weight percent |
|---|---|---|---|---|---|---|---|---|---|---|---|
| Dewaxed heavy neutral, 600-100 DWN [1] | | | | | | | | | | | |
| Do.[1] | 4.5 | 14.0 | 430 | N₂ | 1,000 | 0.19 | 4 | 0.09 | 66.5 | 99 | |
| Do.[1] | 2.0 | 6.3 | 408 | N₂ | 1,000 | 0.06 | +1½ | | 66 | 100 | |
| Do.[1] | 2.0 | 6.3 | 524 | N₂ | 1,000 | 0.14 | +2 | 0.07 | 66 | 99 | 0.27 |
| Dewaxed bright stock, 150-100 DWB [2] | | | | | | 0.03 | 1½ | 0.06 | 64 | 101 | 0.25 |
| Do.[2] | 3.2 | 10.0 | 515 | Vacuum (90 mm. abs.) | | 0.22 | 6+ | | 153.6 | 99 | 0.43 |
| Do.[2] | 1.5 | 4.7 | 515 | | | 0.06 | +5 | | 153.4 | | |
| Do.[2] | 1.5 | 4.7 | 590 | Vacuum (90 mm. abs.) | | 0.17 | 6 | | 152.1 | | |
| | | | | | | 0.06 | 5+ | | 155.8 | | |
| Dewaxed bright stock, 160-90 DWB [3] | | | | | | 0.35 | 7 | 1.31 | 161 | 92 | 0.8 |
| Do.[3] | 5.0 | 15.5 | 515 | N₂ | 1,000 | 0.23 | 6 | 1.2 | 159 | 92 | |
| Do.[3] | 5.0 | 15.5 | 605 | N₂ | 1,000 | 0.03 | 5 | 1.1 | | | |
| Do.[3] | 2 | 6.3 | 510 | N₂ | 1,000 | 0.27 | 6 | 1.2 | 158 | 92 | 0.8 |
| Do.[3] | 2 | 6.3 | 620 | N₂ | 1,000 | 0.03 | 5+ | 1.1 | 154 | 93 | 0.8 |
| Medium lube Dist., 170D [4] | 3.2 | 10.0 | 700 | N₂ | 1,000 | 0.03 | 7 | 1.2 | 101.4 | | 0.76 |
| | | | | | | 2.92 | | | 47.0 | 73 | 1.2 |
| Do.[4] | 16.0 | 50.0 | 410 | N₂ | 1,000 | 0.54 | 2 | | | | |
| Do.[4] | 8.0 | 25.0 | 412 | N₂ | 1,000 | 1.8 | 2+ | | | | |
| Do.[4] | 8.0 | 25.0 | 520 | N₂ | 1,000 | 0.04 | 2½ | 0.17 | 47.2 | 78 | 1.2 |
| Deasphalted oil [5] | | | | | | 1.25 | 8+ | 2.3 | 166.2 | 90 | 1.1 |
| Do.[5] | 16.0 | 50.0 | 510 | N₂ | 1,000 | 0.44 | 8 | | | | |
| Do.[5] | 8.0 | 25.0 | 510 | N₂ | 1,000 | 0.67 | | | 162.9 | 92 | |
| Do.[5] | 8.0 | 25.0 | 615 | N₂ | 1,000 | 0.03 | +5 | 1.2 | 159.9 | 93 | 1.0 |

*Filtrol X-466, a proprietary contacting agent marketed by the Filtrol Company and having the following properties:

Major Constituents:
- SiO₂ ---------------- 75.0%.
- Al₂O₃ --------------- 17.5%.
- MgO ---------------- 4.5%.
- Fe₂O₃ --------------- 1.4%.
- Montmorillonite ------ Natural occurring.
- Size ---------------- Approximately 200 mesh.
- Density ------------- Settled, 41-45#/ft.³.
- Surface area -------- Greater than 300 sq. meters/gm.

**ASTM Designation D974-51T.

[1-4] A solvent-refined lubricating oil prepared by phenol extracting, and MEK dewaxing, a Mid-Continent-type lubricating oil fraction to produce oils having the following characteristics:

| | [1] 600 SUS at 100° F., 100 VI Neutral | [2] 150 SUS at 210° F., 100 VI Bright Stock | [3] 160 SUS at 210° F., 90 VI Bright Stock | [4] Medium Lube Distillate |
|---|---|---|---|---|
| SUS viscosity at— | | | | |
| 100° F. | 575 -600 | 2,400 -2,500 | 3,000 -3,300 | 230 -250 |
| 210° F. | 67 -69 | 150 - 154 | 160 - 170 | 46 - 48 |
| Viscosity index | 100 | 99 - 100 | 89 - 92 | 74 - 78 |
| °API | 29.2 - 29.6 | 26.0 - 26.5 | 24 - 245 | 24 - 25 |
| Flash, °F. | 500 -505 | 570 - 580 | 565 - 575 | 410 -425 |
| CCR, weight percent | 0.04- 0.06 | 0.5 - 0.6 | 1.0 - 1.3 | 0.08- 0.11 |
| Sulfur, weight percent | 0.18- 0.23 | 0.42- 0.48 | 0.75- 0.85 | 1.1 - 1.2 |
| Neutralization value | 0.17- 0.22 | 0.16- 0.23 | 0.35- 0.45 | 2.5 - 3.0 |

[5] A lubricating oil fraction prepared by propane deasphalting a Mid-Continent-type lubricating oil fraction to produce a residuum having the following characteristics:

SUS Viscosity at—
- 100° F.
- 210° F. ---------------- 170 -180
- Viscosity index -------- 78 - 85
- °API ------------------ 21 - 22
- Flash, °F. ------------- 565 -575
- CCR, weight percent --- 1.8- 2.3
- Sulfur, weight percent - 1.2- 1.3
- Neutralization value --- 1.4- 1.8

TABLE II

Contact filtration at higher temperatures showing effect of contacting agent

| Charge oil | Type | Clay, weight percent | Dosage, Lbs./bbl. | Temp., °F. | Pressure, p.s.i.g. | Stripping Gas | Stripping Rate, Cc./min. | Neut. value | Color, NPA | Conradson, weight percent C.R. | SUS vis. at 210° F. | V.I. | Sulfur, weight percent |
|---|---|---|---|---|---|---|---|---|---|---|---|---|---|
| Deasphalted oil.* | Filtrol X-466 | 8.0 | 25.0 | 600 | Atm | N₂ | 1,000 | 1.64 | 8+ | 2.3 | 181.4 | | 1.23 |
| | Filtrol 9% MoO₃ on alumina [1] | 8.0 | 25.0 | 600 | Atm | N₂ | 1,000 | 0.03 | +5 | 2.1 | 175.2 | 86 | |
| | Bauxite | 8.0 | 25.0 | 600 | Atm | N₂ | 1,000 | 0.03 | >8+ | 2.4 | 185.9 | 89 | |
| | AgMoO₃ on alumina [2] | 8.0 | 25.0 | 600 | Atm | N₂ | 1,000 | 0.40 | | 2.2 | 188.4 | 87 | |
| | Attapulgus [3] | 8.0 | 25.0 | 600 | Atm | N₂ | 1,000 | 0.36 | +8 | Dil. 2.6 | 191.4 | 91 | |
| | 5% SiO₂, 95% Al₂O₃ | 8.0 | 25.0 | 600 | Atm | N₂ | 1,000 | 0.72 | >8+ | 2.3 | 184.4 | 90 | |
| | | 8.0 | 25.0 | 600 | Atm | N₂ | 1,000 | 0.12 | 5 | | 174.6 | 93 | 1.17 |

[1] Filtrol, 9% MoO₃ on alumina:
- 90% Al₂O₃.
- 1% SiO₂.
- 9% MoO₃.

[2] AgMoO₃:
- 6.7% Ag.
- 11.0% MoO₃.
- 82.3% Al₂O₃.

[3] Attapulgus:
- 67.5 SiO₂.
- 12.8 Al₂O₃.
- 11.1 MgO.
- 4.5 Fe₂O₃.

*Same characteristics as deasphalted oil described in Table I.

essing described in the prior art. Therefore, depending upon the lubricating oil stock treated, the amount used in this invention will vary between about 5 to 30 pounds per barrel.

The temperatures utilized will be in accordance with the schedule in Table III.

TABLE III

| Contact Filtration Charge Stock | Contacting Temperature, °F. |
|---|---|
| Neutral oils and unfinished distillates having a viscosity of 100–900 S.U.S. at 100° F | 490–510 |
| Bright stocks and unfinished fractions having a viscosity of 120–200 S.U.S. at 210° F | 590–620 |

Contacting times will depend upon the quantity of oil being treated, the efficiency of moisture removal, and other factors. Times will range between about ¼ to 1 hour. However, under normal conditions contact times of about 35 minutes are satisfactory.

As shown in the hereinbefore-mentioned U.S. patent application, moisture removal from the adsorbent is directly correlated to reduction in neutralization value. In applying this earlier discovery to the conventional contact filtration process, it is seen that it is possible to substantially reduce the neutralization value, improve the color, and reduce the emulsification tendency of a lube oil stock by a method which does not increase the ash content of the stock, regardless of whether the neutralization value is caused by the presence of inorganic or organic acids, an accomplishment which heretofore has been deemed to be not economically feasible. The uniqueness of this discovery is further illustrated by the fact that both the use of steam and an inert, desiccated, non-oxidizing gaseous medium such as nitrogen gave approximately the same color improvement, indicating that the color removal properties of the clay are independent of the moisture content of these adsorbents. Furthermore, the time element involved in the contacting operation is also critical. It has been demonstrated that the time of oil-clay contact necessary for substantially complete clarification and decolorization of the lubricating oil is not sufficient to effect maximum reduction of the neutralization value of said oil. A finite time, dependent upon the amount of moisture, method of removal, type of equipment employed, etc., is required to remove the moisture and hence effect maximum neutralization number reduction, this time being independent of the time required for decolorization. According to the present invention, a still further improvement in contact filtration is provided by carrying out the contacting at temperatures about 100° F. higher than those normally employed in contacting operations. By employing this expedient, substantial improvements in the properties of the treated oils are obtained using substantially less contacting agent than would be required in carrying out the contacting at lower temperatures.

I claim as my invention:

1. A process for reducing to a value not higher than 0.03 the neutralization value of an organic acid-containing, petroleum, lubricating oil selected from the group of bright stocks and deasphalted residual oil fractions having viscosities of about 130–180 S.U.S. at 210° F. comprising intimately contacting said oil for about one-fourth to one hour at a temperature of 590–600° F. with an amount sufficient to reduce said neutralization value to 0.03 of montmorillonite containing 75% silica, 17.5% alumina, 4.5% magnesia and 1.4% ferric oxide by weight, said amount being from 1.5 to 4.8 pounds per barrel of oil for each one-tenth unit of neutralization number of the oil and said montmorillonite having substantially all of its bound water removed without deleteriously affecting the structural water content thereof, said contacting being carried out in the absence of air and steam under anhydrous conditions by stripping any moisture produced from the contacting zone.

2. A process in accordance with claim 1 in which said contacting is carried out in the presence of, and said stripping is accomplished by, an inert gaseous stripping medium which is introduced at a rate sufficient to purge said zone of air, free said montmorillonite from adsorbed water under the contacting conditions in said zone, and maintain said zone substantially free from accumulated water during said agitating.

3. A process in accordance with claim 1 in which said stripping is accomplished by carrying out said agitating at a subatmospheric pressure sufficiently low to remove substantially all of the air from said zone, free said montmorillonite from adsorbed water, and maintain said zone substantially free from accumulated moisture.

4. The process in accordance with claim 1 in which the lubricating oil is deasphalted oil.

References Cited in the file of this patent

UNITED STATES PATENTS

| 1,654,581 | Cross | Jan. 3, 1928 |
| 2,199,940 | Stockman | May 7, 1940 |
| 2,563,369 | Reiley et al. | Aug. 7, 1951 |
| 2,572,433 | Bergstrom et al. | Oct. 23, 1951 |
| 2,651,602 | Davis et al. | Sept. 8, 1953 |
| 2,679,471 | Ayers et al. | May 25, 1954 |
| 2,795,535 | Crosby et al. | June 11, 1957 |

OTHER REFERENCES

Mantell: "Absorption," first edition, McGraw-Hill Book Company, New York, 1945; page 49 relied on.